United States Patent
Agnew et al.

(10) Patent No.: US 8,209,265 B1
(45) Date of Patent: Jun. 26, 2012

(54) ELECTRONIC SETTLEMENT SYSTEM FOR MINERAL PRODUCTION, DISTRIBUTION AND SALES

(75) Inventors: Frank D. Agnew, Metairie, LA (US); Thomas J. Agnew, Dallas, TX (US)

(73) Assignee: EquityMetrix, LLC, Dallas, TX (US)

( * ) Notice: Subject to any disclaimer, the term of this patent is extended or adjusted under 35 U.S.C. 154(b) by 833 days.

(21) Appl. No.: 11/374,680

(22) Filed: Mar. 14, 2006

Related U.S. Application Data

(60) Provisional application No. 60/662,417, filed on Mar. 16, 2005.

(51) Int. Cl.
*G06Q 50/00* (2012.01)
(52) U.S. Cl. .................. 705/313; 705/311
(58) Field of Classification Search ........... 705/1, 1.1, 705/311, 313
See application file for complete search history.

(56) References Cited

U.S. PATENT DOCUMENTS

| | | | |
|---|---|---|---|
| 6,311,170 B1 * | 10/2001 | Embrey | 705/40 |
| 7,676,420 B1 | 3/2010 | Agnew et al. | |
| 2003/0216995 A1 * | 11/2003 | DePauw et al. | 705/37 |
| 2008/0215377 A1 * | 9/2008 | Wottowa et al. | 705/4 |

OTHER PUBLICATIONS

Edmund L. Andrews, "As Profits Soar, Companies Pay U.S. Less For Gas Rights," The New York Times, (Jan. 23, 2006).

* cited by examiner

*Primary Examiner* — Heidi Riviere
(74) *Attorney, Agent, or Firm* — Hammer & Associates, P.C.

(57) ABSTRACT

An electronic settlement system for mineral production, distribution, and sales includes a plurality of modules and a processor for using information from those modules to effect a settlement between the parties involved in the production, distribution, and sales of minerals. The modules for information sufficient to perform the settlement includes: payor module, well tax module, mineral owner module, division order module, gathering system and gas plant module, wellhead price module, mineral lease and agreement module, product movement and balancing module, mineral ownership and book entry and netting module.

22 Claims, 13 Drawing Sheets

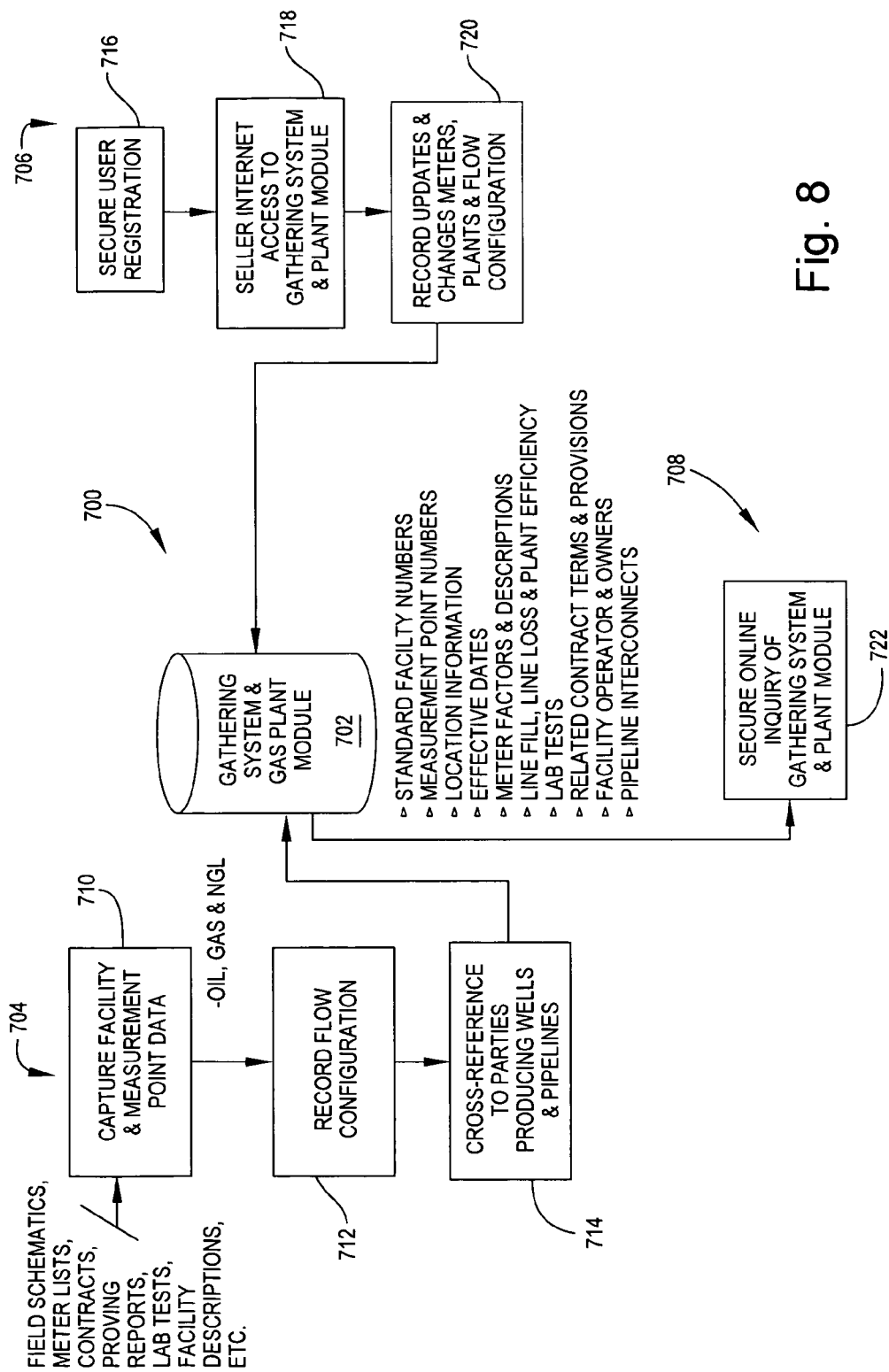

ELECTRONIC SETTLEMENT SYSTEM FOR MINERAL PRODUCTION, DISTRIBUTION AND SALES

RELATED APPLICATION

This application claims the benefit of the U.S. Provisional Patent Application Ser. No. 60/662,417 filed Mar. 16, 2005, which is incorporated herein by reference.

FIELD OF THE INVENTION

The instant invention is directed to an electronic settlement system for mineral production, distribution, and sales.

BACKGROUND OF THE INVENTION

In co-pending U.S. patent application Ser. No. 10/465,296 filed Jun. 19, 2003, the instant inventors disclosed a conceptual process for the electronic settlement of petroleum and gas distributions.

Since the advent of deregulation, the settlement chain for minerals (e.g., crude oil and/or natural gas), from their source in the ground (a/k/a wellhead) to purchasers, has been broken up and now typically involves multiple entities each subject to a myriad of contractual rights, obligations, and regulations.

For example, a landowner (a/k/a owners) contracts, via a lease, with an oil and gas company to drill a well (a/k/a operators) to produce the minerals from the land. The terms of the lease may grant the owner a royalty of $\frac{1}{8}^{th}$ of the minerals produced each month valued at the highest commercially available price in the area. The operator subsequently enters into a joint operating agreement with two additional oil and gas companies (a/k/a working interest owners) to participate in the development of the well. The joint operating agreement delineates how costs and the volumes of minerals produced will be divided among the companies. The operator and each working interest owner separately contract with marketers to sell the minerals produced to end users (a/k/a purchasers). Further, the operator and each working interest owner separately contract with transporters to deliver their share of the minerals produced to their respective purchaser. Finally, upon completion of each sale of their respective interest in the minerals produced the operator and each working interest owner must pay royalties to the owner. In addition, the operator and working interest owners must pay taxes and file required regulatory reports to various governmental agencies on their share of the minerals produced.

Already with a simple single well scenario and a single landowner, the complexity of the settlement is obvious. The complexity of settlement compounds when one adds multiple owners, multiple wells, multiple entities at each level of the chain, and asset and owner turnover. Further, adding to the complexity is the opaqueness of pricing, transportation and marketing costs, and the imperfect flow of information between entities at each level.

It is inevitable that such complexity will generate disputes. For example see: Andrews, E. L., "*As Profits Soar, Companies pay U.S. less for Gas Rights*," New York Times, Jan. 23, 2006.

Accordingly, there is a need for an electronic settlement system for mineral production, distribution and sales.

DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 8 is a schematic illustration of a gathering system and gas plant module.

SUMMARY OF THE INVENTION

An electronic settlement system for mineral production, distribution, and sales includes a plurality of modules and a processor for using information from those modules to effect a settlement by and between the parties involved in the production, distribution, and sales of minerals. The modules for maintaining the information sufficient to perform the settlement include: payor module, well tax module, mineral owner module, division order module, gathering system and gas plant module, wellhead price module, mineral lease and agreement module, product movement and balancing module, mineral ownership and book entry and netting module.

DESCRIPTION OF THE INVENTION

In the following discussion of the invention, the term mineral is used as a generic term to cover any material produced from the earth or the ocean. In one embodiment, mineral refers to crude oil and/or natural gas produced from a wellhead. Owner is a generic term to refer to the entity that owns the rights to receive value for the mineral produced from a wellhead. Operator is a generic term referring to an entity responsible to the owner for producing and selling the mineral produced from the wellhead. Working interest owner is a generic term to describe an entity in a contractual arrangement with an operator to share in the cost, volumes, and sales of the mineral produced from the wellhead. Transporter is a generic term for the entity that performs gathering and transportation services to deliver the mineral produced from the wellhead to the purchaser. Processor is a generic term for the entity that processes certain types of minerals to extract additional products from the mineral produced from the wellhead. Marketer is a generic term for an entity that sells, either on an agency or principal basis, the mineral produced from the wellhead on behalf of the operator or working interest owner. Purchaser is a generic term for the entity that purchases the mineral produced from the wellhead and typically interacts with the any seller: e.g., operator, working interest owner, or marketer.

Electronic Settlement System

Figure 1:
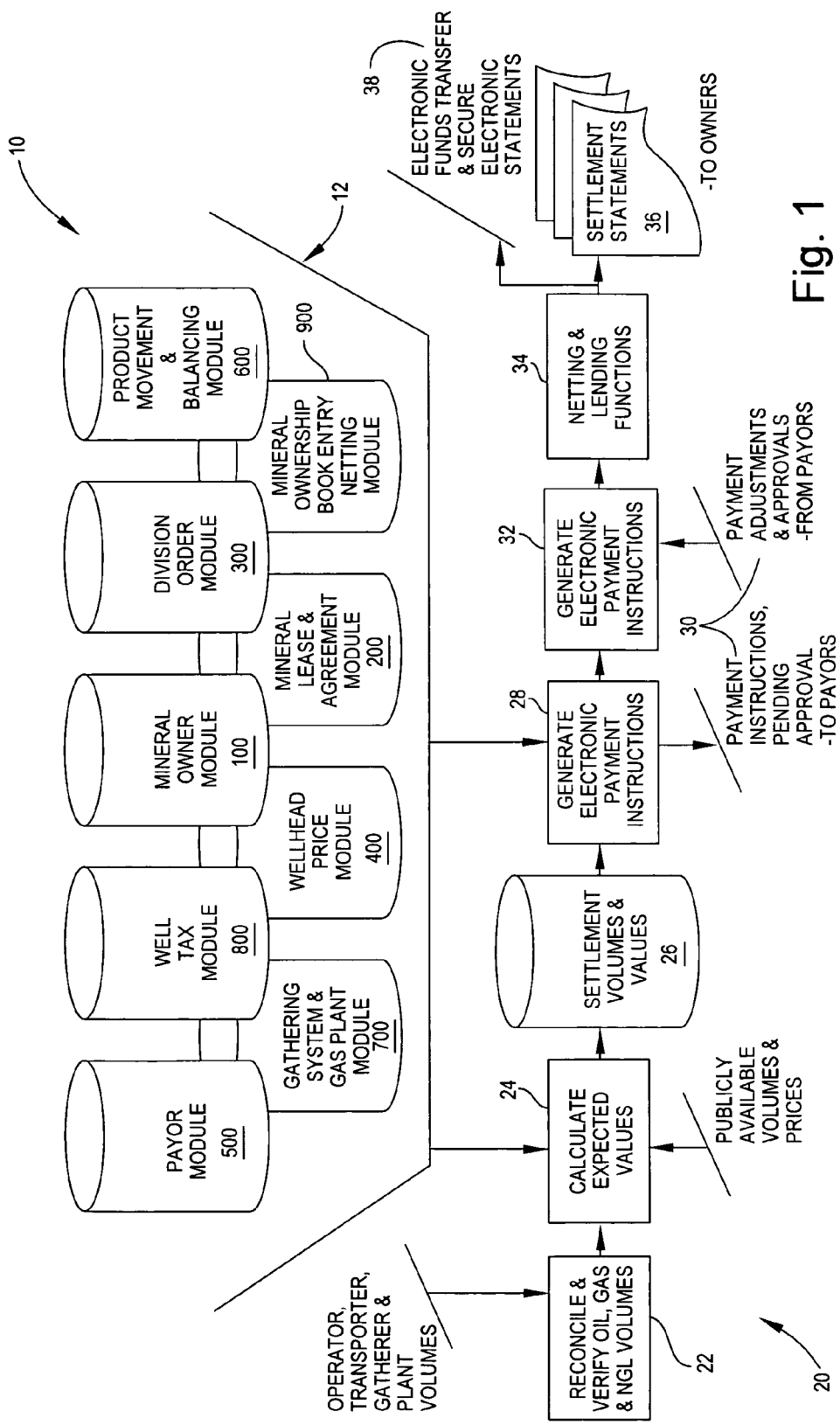
FIG. 1 is a schematic illustration of an electronic settlement system for mineral production, distribution and sales.

Referring to FIG. 1, an electronic settlement system 10 is illustrated. As one aspect of the invention, system 10 is a clearinghouse to standardize, authenticate, and settle mineral (e.g., oil and gas) sales at the wellhead. A goal of the system 10 is to provide transparency and certainty to mineral sales using a centralized electronic clearing process. By providing transparency and certainty to the process, transactions will be settled in a timelier manner, and disputes, which are common in the existing process, should be minimized. Thus, the risk and cost of settlements can be reduced.

In general, system 10 utilizes a bank of modules 12 as its source of information for the settlement process. The bank of modules 12 may comprise, for example, at least two of the following, which are discussed in greater detail below: a mineral owner module 100; a mineral lease and agreement module 200; a division order module 300; a wellhead price module 400; a payor module 500; a product movement and balancing module 600; gathering system and gas plant module 700; a well tax module 800; and mineral ownership and book entry and netting module 900.

Settlement process 20 comprises the steps to settle the sale of minerals. The components of the settlement system 20, discussed below, interact with the bank of modules 12. This interaction may include, for example, the use of information from one or more of modules of bank 12.

Settlement process 20, in general, authenticates and reconciles the volume of minerals produced from a wellhead, computes the value of minerals produced from a wellhead, computes payments due to and from the various parties, and, optionally, intermediates those payments. Value means, for example, the price of the mineral as determined by the various agreements between the parties.

For example, settlement process 20 compiles data on the volumes of the mineral produced from various wellheads 22. Settlement process 20 compiles data on the value of the mineral produced from those various wellheads 24. Optionally, price and volume data may be compared with publicly available price and volume data. The volume data 22 and the value data 24 may be compiled, reconciled, and authenticated to generate settlement values 26 for the minerals produced. Initial payment instructions 28 are generated from the settlement values 26. Optionally, these initial payment instructions may be forwarded to payors for review, adjustment, and approval 30. Final payment instructions 32 are generated from the compilation of the initial payment instructions 28 and the payor adjustment/approval instructions 30. Settlement statements and regulatory reports 36 are generated from the final payment instructions 32 and reported to owners and regulatory agencies.

Optionally, system 10 may have certain banking functions. For example, system 10 may: collect monies from payors; disburse monies to payees (e.g., owners); lend monies to payors or owners; and provide other services associated therewith. The basis of the loans to owners may be, for example, the revenue stream from minerals produced. Accordingly, system 10 may, based upon information contained in the settlement statements 36, make payments to the owners 38, via, for example, electronic funds transfer, check, or other secure means. Additionally, if an owner had taken a loan from system 10, then prior to any distribution 38, the debt service on the loan may be deducted from such distribution via a netting and lending module 34. Additionally, because of multiple wells, cross ownership and operating agreements, it is common that entity A owes entity B monies from the sale of minerals in well X and simultaneously is owed money from entity B from the sales of minerals in well Y, system 10, via the netting and lending module, may net the payments to each entity.

Mineral Owner Module 100

Figure 2:
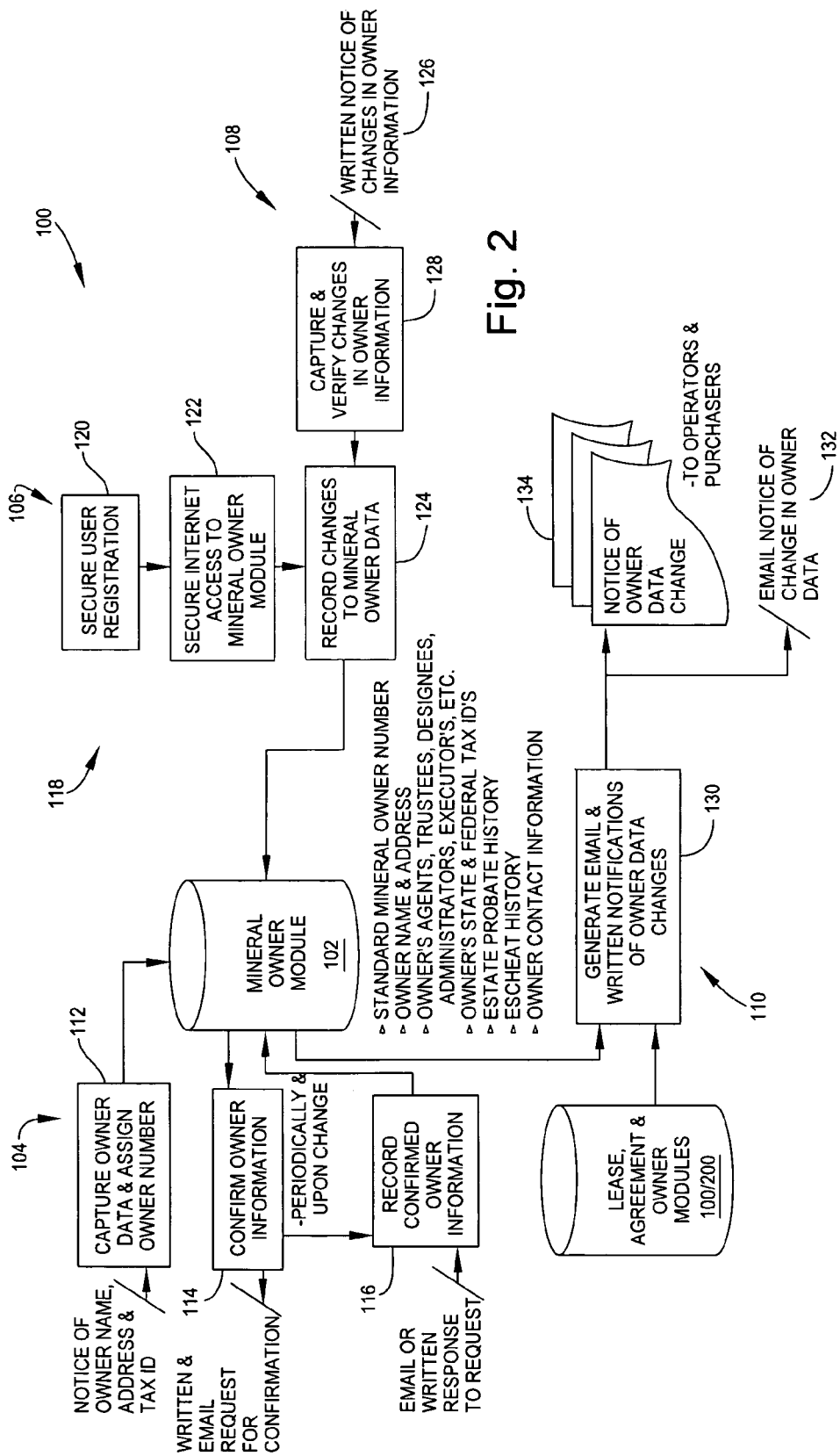
FIG. 2 is a schematic illustration of a mineral owner module.

One embodiment of mineral owner module 100 is illustrated in FIG. 2.

Mineral owner module 100 is primarily intended to record and maintain mineral owner information. A central feature of module 100 is a database 102. Database 102 comprises records of each owner in the system 10. A record in database 102 may comprise one or more of the following fields: a mineral owner identification number; the owner's name and address; the name and address of an owner's agent, trustee, designee, administrator, executor, or the like (if applicable); the owner's state and federal tax identification numbers; estate/probate history; escheat history; owner's deposit instructions; and other owner contact information. Other fields may be added hereto as deemed appropriate.

In the embodiment illustrated in FIG. 2, module 100 includes, in addition to database 102, an application 104 for the capture of owner information, an application 106 for self-maintenance of owner information, an application 108 for centralized maintenance of owner information, and an application 110 for the notification of operators and purchasers of changes to owner information. The module may include additional or other applications as deemed appropriate.

Application 104 for the capture of owner information may include a procedure 112 for the initial receipt of owner information and the assignment of an owner identification number. Application 104 may additionally include a procedure 114 whereby once the initial owner information is compiled, that information is sent to the owner for confirmation, and a procedure 116 whereby the owner confirms the initial information.

Application 106 for the self-maintenance of owner information may include a procedure 118 that allows the owner to self maintain their information in database 102. In this embodiment, application 106 may be carried out via an electronic means, such as over the Internet. Procedure 118 may include a method 120 for allowing secure access to a record in the database, provided for secure access 122 to that record, and a method 124 for making changes to the record.

Application 108 for the centralized maintenance of owner information may provide a means to make changes to owner information by a non-electronic input from the owner or owner representative. For example, the owner may call or write 126 to system 10 and request changes to their information and would make those changes 124 via application 108 after verification 128.

Application 110 for the notification of operators and purchasers of changes to owner information may provide a procedure for updating other modules within the system 10 of changes to ownership information and a procedure for notifying the operators, working interest owners, purchasers, and others of changes in ownership information. For example, a change in ownership information may have an effect upon information contained in another module, such as the mineral and lease agreement module 200. Thus, application 110 would update module 200 of changes to the ownership information and generate a notice 130, for example an e-mail 132 and/or a written notice 134, to the operator or purchaser of the change.

Mineral Lease and Agreement Module 200

Figure 3:
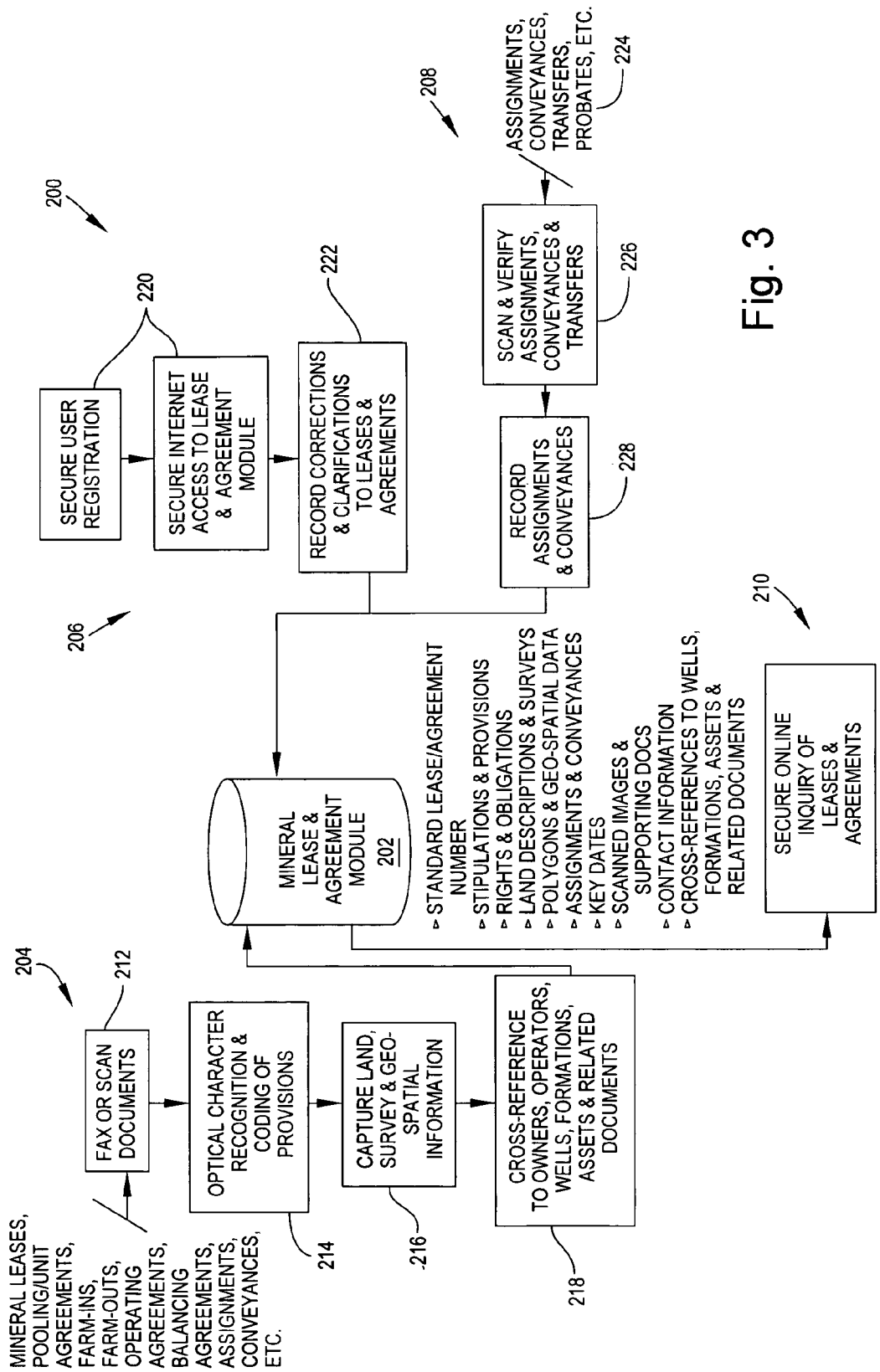
FIG. 3 is a schematic illustration of a mineral lease and agreement module.

One embodiment of the mineral lease and agreement module 200 is illustrated in FIG. 3.

Mineral lease and agreement module 200 is primarily intended to record and maintain information about mineral leases and agreements. A central feature of module 200 is a database 202. Database 202 comprises records related to a mineral leases and agreements maintained by system 10. A record in database 202 may comprise one or more of the following fields: a standard lease/agreement number; stipulations and provisions; rights and obligations; land descriptions and surveys; polygons and geospatial data; assignments and conveyances; key dates; scanned images and supporting documents; contact information; and cross-references to mineral locations, wells, formations, assets, and related information. Other fields may be added hereto as deemed appropriate.

In the embodiment illustrated in FIG. 3, module 200 includes, in addition to database 202, an application 204 for capturing and cross-referencing leases and agreements, an application 206 for the self-maintenance of mineral lease and agreement information, an application 208 for centralized maintenance of mineral lease and agreement information, and an application 210 for the secure access to mineral lease and agreement information. The module may include additional or other applications as deemed appropriate.

Application 204 for capturing and cross-referencing mineral lease and agreement information may include: a procedure 212 whereby mineral lease and agreement information is initially captured in electronic form, such as by fax or scanning. Mineral lease and agreement information may include information about: mineral leases, pooling agreements, unit agreements, farm-ins, farm-outs, operating agreements, balancing agreements, assignments, conveyances, and other information that may be deemed appropriate. A procedure 214 converts previously electronically captured mineral lease and agreement information from procedure 212, via, for example, optical character recognition, into electronic form for the coding of provisions in those agreements. A procedure 216 captures land survey and geospatial information about the location of the mineral lease and agreement information. A procedure 218 cross-references information captured in procedures 212 and 216 to itself and other related information.

Application 206 for the self-maintenance of mineral lease and agreement information, in this embodiment, may be carried out via an electronic means, such as over the Internet. Application 206 may include a method 220 for allowing secure access to a record in the database, and a method 222 for making changes to the record.

Application 208 for the centralized maintenance of mineral lease and agreement information may provide a means to make changes to such information by a non-electronic input. For example, an appropriate entity may call or write 224 to system 10 and request changes to the information and those changes 228 would be made via application 208 after verification 226 and appropriate record-keeping, such as electronic record (scanning) of the request.

Application 210 may provide secure online access to mineral lease and agreement information to appropriate entities.

Division Order Module 300

Figure 4A:
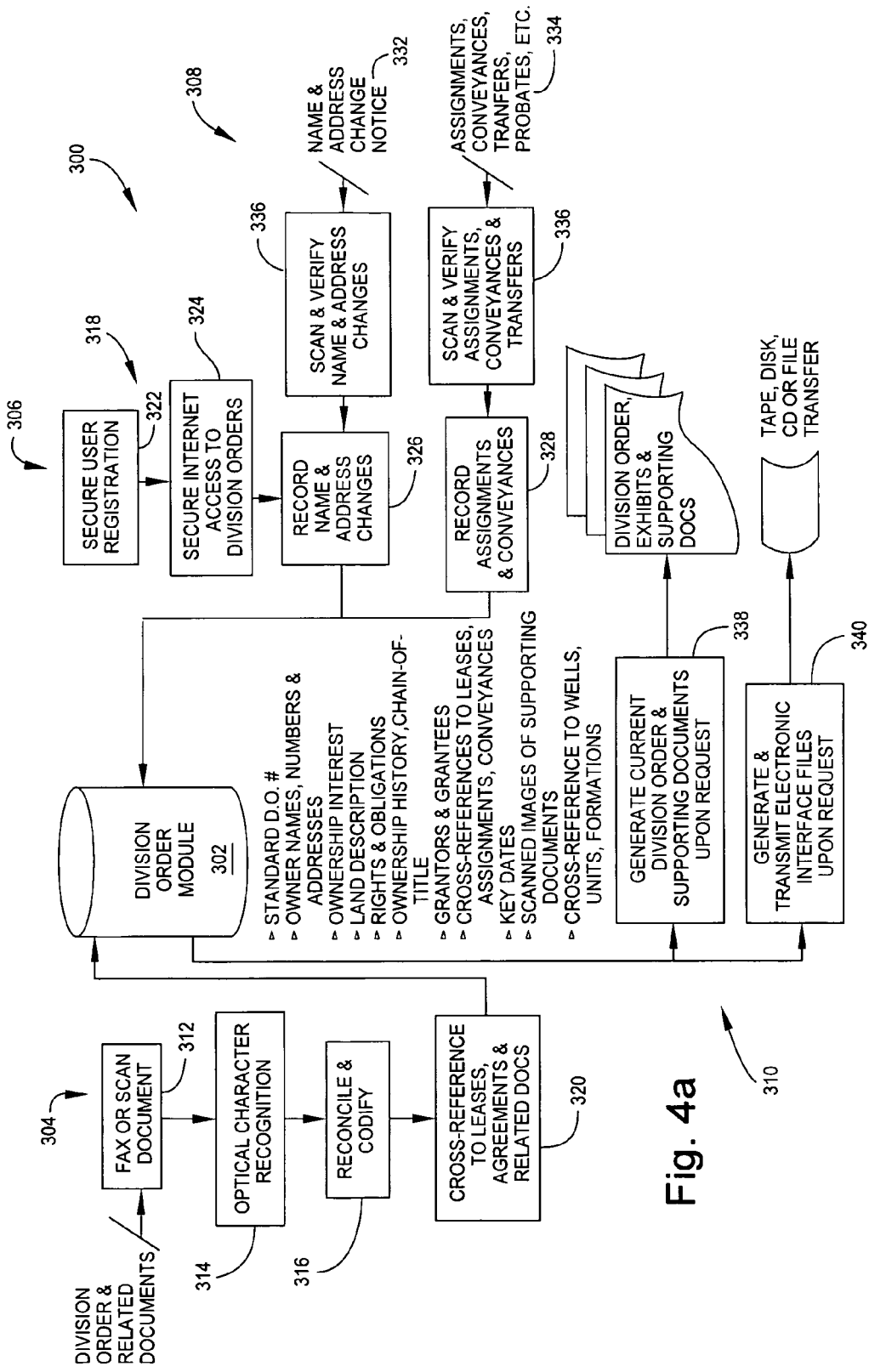
FIGS. 4a and 4b are schematic illustrations of a division order module.
Figure 4B:
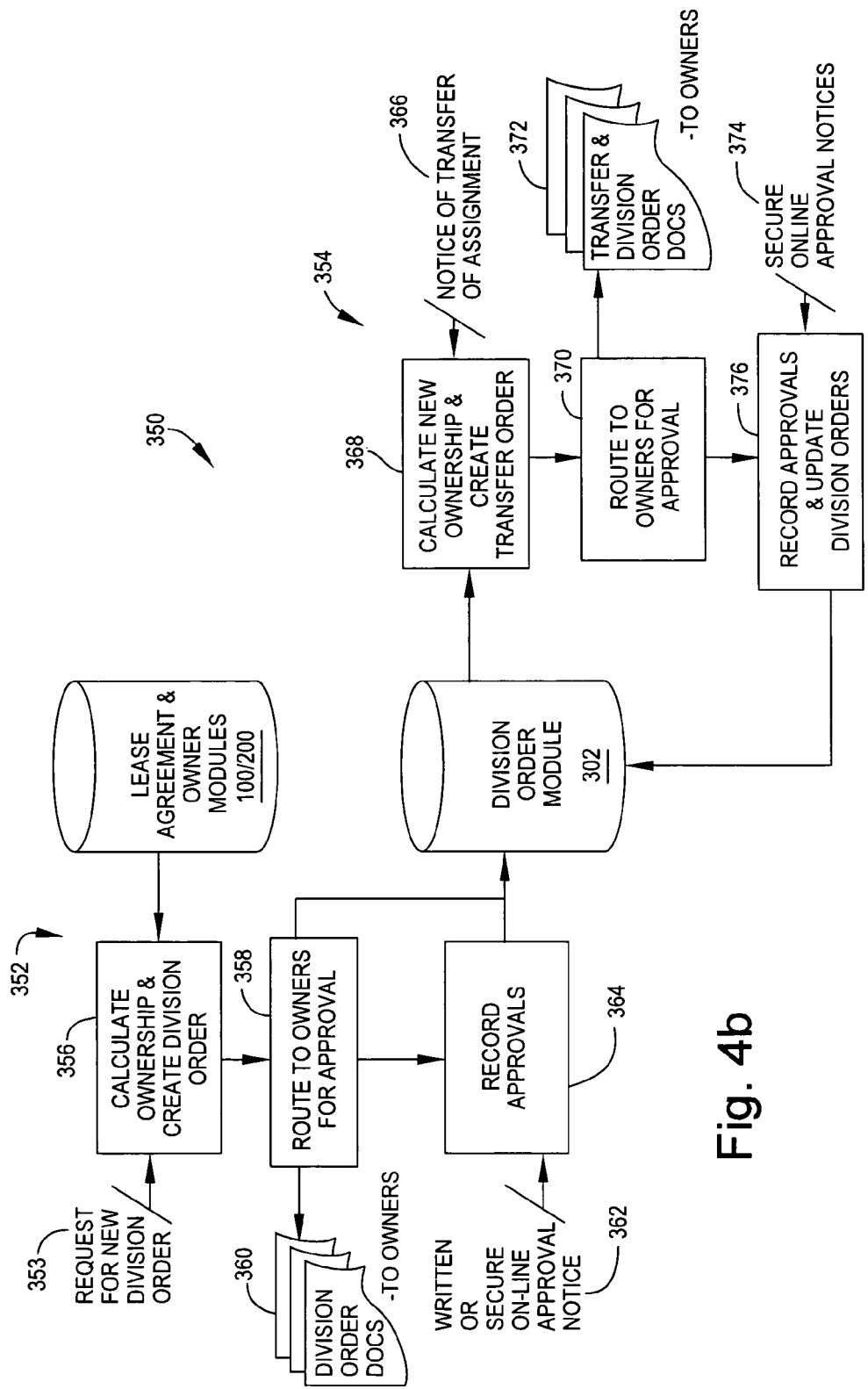

One embodiment of the division order module 300 is illustrated in FIGS. 4a and 4b.

Division order module 300 is primarily intended to record and maintain information about division orders, see FIG. 4a. Division order module 300 is also intended to create new division orders, see FIG. 4b. A central feature of module 300 is database 302.

Database 302 comprises records of division orders in the system 10. A record in database 302 may comprise one or more of the following fields: a standard division order number; owner names, numbers, and addresses; ownership information; description of land, mineral rights and obligations; ownership history, chain of title; grantor's and grantees; cross-references to leases, assignments, and conveyances; key dates; scanned images of supporting documents; cross-references to location on mineral rights, units and formations. Other fields may be added hereto as deemed appropriate.

In the embodiment illustrated in FIG. 4a, module 300 includes, in addition to database 302, an application 304 for the capture of division order information, an application 306 for the self-maintenance of division order information, an application 308 for the centralized maintenance of division order information, and an application 310 for generating division order documentation. The module may include additional or other applications as deemed appropriate.

Application 304 for the capture of division order information may include: a procedure 312 for the electronic capture of division orders and related documentation, for example by fax or scanning; a procedure 314 for the conversion of electronically captured information into electronic form, such as by optical character recognition; a procedure 316 for the reconciliation and codification of the information; and a procedure 320 for the cross-referencing of division order information to, for example, leases, agreements, and related documents.

Application 306 for the self-maintenance of division order information may include: a procedure 318 that allows the self-maintenance of division order information in the database 302. In this embodiment, application 306 may be carried out via electronic means, such as over the Internet. Application 306 may include a security method 322 that only allows pre-approved entities access, a secure communication means 324, a method 326 to record names and addresses of entities affected, and a method 328 to record assignments and conveyances.

Application 308 for the centralized maintenance of division order information may provide a means to make changes to division order information by non-electronic input. For example, an entity may call or write to system 10 requesting a change to a name or address 332 affecting a division order or a change to an assignment, conveyance affecting a division order 334. Such a change 326/328 would be made after appropriate verification and recordal of the request 336.

Application 310 for generating division order documentation may include a procedure 338 for generating current division order information and supporting documentation, and a procedure 340 for generating and transmitting electronic interface files regarding division order information.

In the embodiment illustrated in FIG. 4b, module 300 includes a procedure 350 for generating new division orders. Procedure 350 may include an application 352 for generating new division orders and an application 354 for generating transfer orders and updating division orders.

Application 352 may operate as follows: the request for a new division order is received 353; the recalculation of ownership interest is calculated 356 based upon information 353 and information from databases 102 and 202; the revised information 356 is routed to owners for approval 358, preferably with written confirmation 360; owners provide approval or comment 362; approvals are recorded 364; and changes are made in the division order database 302 and elsewhere as appropriate.

Application 354 may operate as follows: a notice of the transfer or assignment is received 366; a recalculation of ownership interest and the transfer order is created 368; this information 368 is routed to owners for approval 370, preferably in a printed form 372; once approvals are received 374; database 302 and others where appropriate are updated 376.

Wellhead Price Module 400

Figure 5:
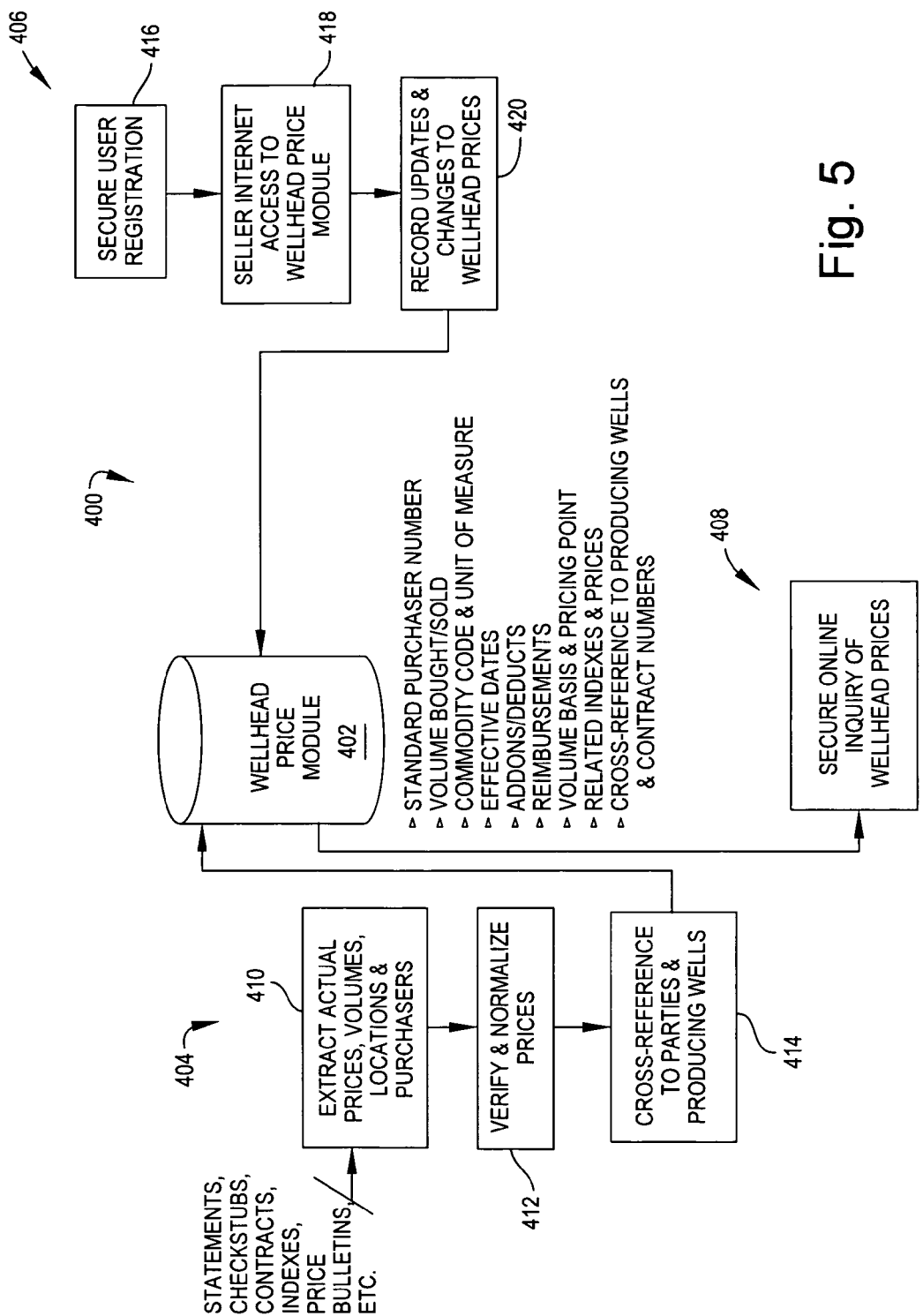
FIG. 5 is a schematic illustration of a wellhead price module.

One embodiment of wellhead price module 400 is illustrated in FIG. 5.

Wellhead price module 400 is primarily intended to record and maintain wellhead prices. A central feature of the module 400 is database 402. Database 402 comprises records related to wellheads, their locations, and appropriate pricing references. A record in database 402 may comprise one or more of the following fields: a standard purchaser information; information about mineral bought/sold; commodity code; effective dates; add-ons/deducts; reimbursements; volume basis and pricing points; related indexes and prices; cross-references to producing wells and contract numbers. Other fields may be added hereto as deemed appropriate.

In the embodiment illustrated in FIG. 5, module 400 may include, in addition to database 402, an application 404 for the capture and cross-reference of wellhead prices, an application 406 for the maintenance of wellhead prices, and an application 408 for access to wellhead prices.

Application 404 for the capture and cross-reference of wellhead prices may include: a procedure 410 for the extraction of actual prices, volumes, locations and purchasers of minerals from a wellhead; a procedure 412 for the verification and normalization of prices; and a procedure 414 for cross-referencing prices to parties and producing wells.

Application 406 for the maintenance of wellhead prices may include: a security means 416 for allowing only authorized entity access; a secure communication means 418; and a means for making changes to and updating wellhead prices 420.

Application 408 for access to wellhead prices may include a secure procedure for authorized entities to review price information recorded and maintained in database 402.

Payor Module 500

Figure 6:
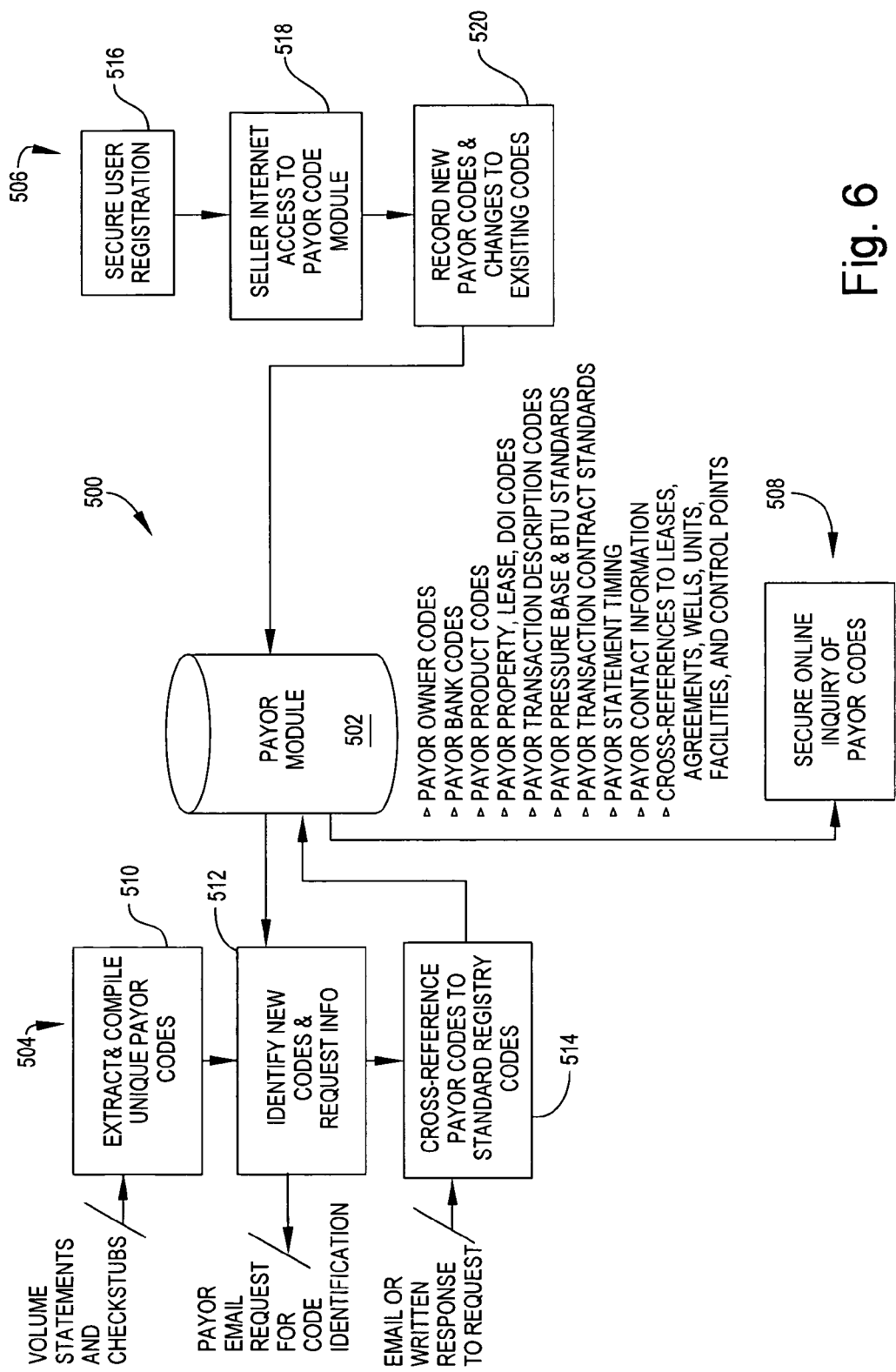
FIG. 6 is a schematic illustration of a payor module.

One embodiment of payor module 500 is illustrated in FIG. 6.

Payor module 500 is primarily intended to record and maintain payor information. A central feature of module 500 is database 502. Database 502 comprises records of the each payor in system 10. A record in database 502 may comprise one or more of the following fields: payor codes; payor/owner codes; payor bank codes; payor product codes; payor property, lease, Division of Interest (DOI) codes; payor transaction description codes; payor pressure base and BTU standards; payor transaction contract standards; payor statement timing; payor contact information; cross-references to leases, agreements, wells, units, facilities, and control points. Other fields may be added hereto as deemed appropriate.

In the embodiment illustrated in FIG. 6, module 500 may include, in addition to database 502, an application 504 for the capture and cross-referencing of payor information, an application 506 for the maintenance of payor information, and an application 508 for accessing payor information. The module may include additional or other applications as deemed appropriate.

Application 504 for the capture and cross-referencing of payor information may include: a procedure 510 for the extraction and compilation of payor information; a procedure 512 for providing new payor information; and a procedure 514 for cross-referencing payor information to standard codes within Database 502.

Application 506 for the maintenance of payor information may include: a security means 516 for allowing access to selected entities; a means of secure communication 518; and a means for changing payor information 520.

Application 508 for accessing payor information may allow entities to review payor information over a secure communication channel, such as the Internet.

Product Movement and Balancing Module 600

Figure 7:
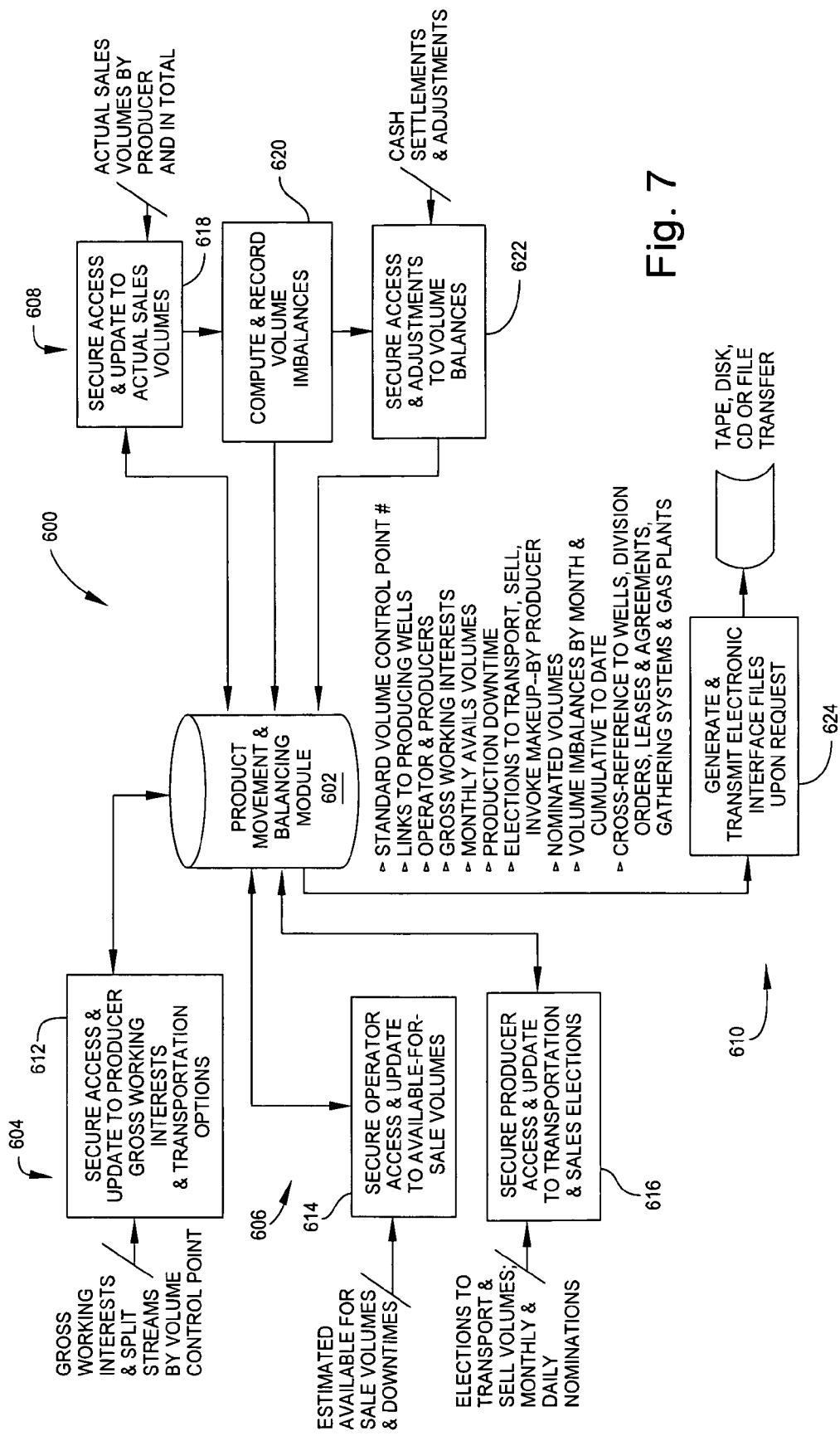
FIG. 7 is a schematic illustration of a product movement and balancing module.

One embodiment of product movement and balancing module 600 is illustrated in FIG. 7.

Product movement and balancing module 600 is primarily intended to record and disseminate product movements and volume balance. A central feature of module 600 is database 602. Database 602 comprises records of product movement and volume balances of minerals tracked by system 10. The record in database 602 may comprise one or more of the following fields: standard volume control point numbers; links to producing wells; actual production volume; operator and producer information; gross working interest; monthly available volumes; production downtimes; elections to transport, sell, invoke makeup by producers; nominated volumes; volume imbalances by month and cumulative-to-date; and cross-references to wells, division orders, leases and agreements, and gathering systems and gas plants. Other fields may be added hereto as deemed appropriate.

In the embodiment illustrated in FIG. 7, module 600 includes, in addition to database 602, an application 604 for the recording of products splits; an application 606 for the recording of product of availabilities and product elections and nominations; an application 608 for recording of volume balances; and an application 610 for the dissemination of product movement and balancing information. The module may include additional or other applications as deemed appropriate.

Application 604 for the recording of products splits may include a secure means 612 accessing and updating gross working interests and transportation options to purchasers.

Application 606 for the recording of product availabilities and elections may include a secure means 614 to access and update information about minerals available for sale by operators, and a secure means 616 to access and update transportation and sales elections by purchasers.

Application 608 for the recording of volume balances may include: a secure means 618 to access and update actual sales volumes by purchasers; a means 620 for computing and recording volume imbalances; and a secure means 622 to access and make adjustments to volume balances.

Application 610 for the dissemination of product movement and balancing information may include means to securely disseminate mineral availability, mineral elections, nominations and balance information to registered purchasers and transporters. This information would be generated and transmitted 624, upon request.

Gathering System and Gas Plant Module 700

One embodiment of gathering system and gas plant module 700 is illustrated in FIG. 8.

Gathering system and gas plant module 700 records and maintains gathering system and flow information and gas plant information. A central feature of module 700 is database 702. Database 702 comprises records related to the gathering system and gas plants in system 10. A record in database 702 may comprise one or more of the following fields: standard facility numbers; measurement point numbers; location information; effective dates; meter factors and descriptions; line fill, line loss, and plant efficiencies; lab tests; related contract terms and provisions; facility operator and owner information; and pipeline interconnections.

In the embodiment illustrated in FIG. 8, module 700 includes, in addition to database 702, an application 704 for the capture of information about the gathering systems and gas plants, an application 706 for the maintenance of information about the gathering systems and gas plants, and an application 708 for access to the gathering system and gas plant information. The module may include additional or other applications as deemed appropriate.

Application 704 for the capture of information about the gathering systems and gas plants may include: a procedure 710 for capturing information about the facility and measurement point data; a procedure 712 for recording flow configurations; and a procedure 714 for cross-referencing parties to producing wells and pipelines.

Application 706 for the maintenance of information about gathering systems and gas plants may include: a secure means 716 for limiting access to the module; a means 718 for secure communications; and a method 720 for making changes and updating information about the gathering system and gas plants that may include information about meters, plants, and flow configurations.

Application 708 for access to the gathering system and gas plant information may include a secure means for accessing such information, for example, over a secure Internet access means 722.

Well Tax Module 800

Figure 9A:
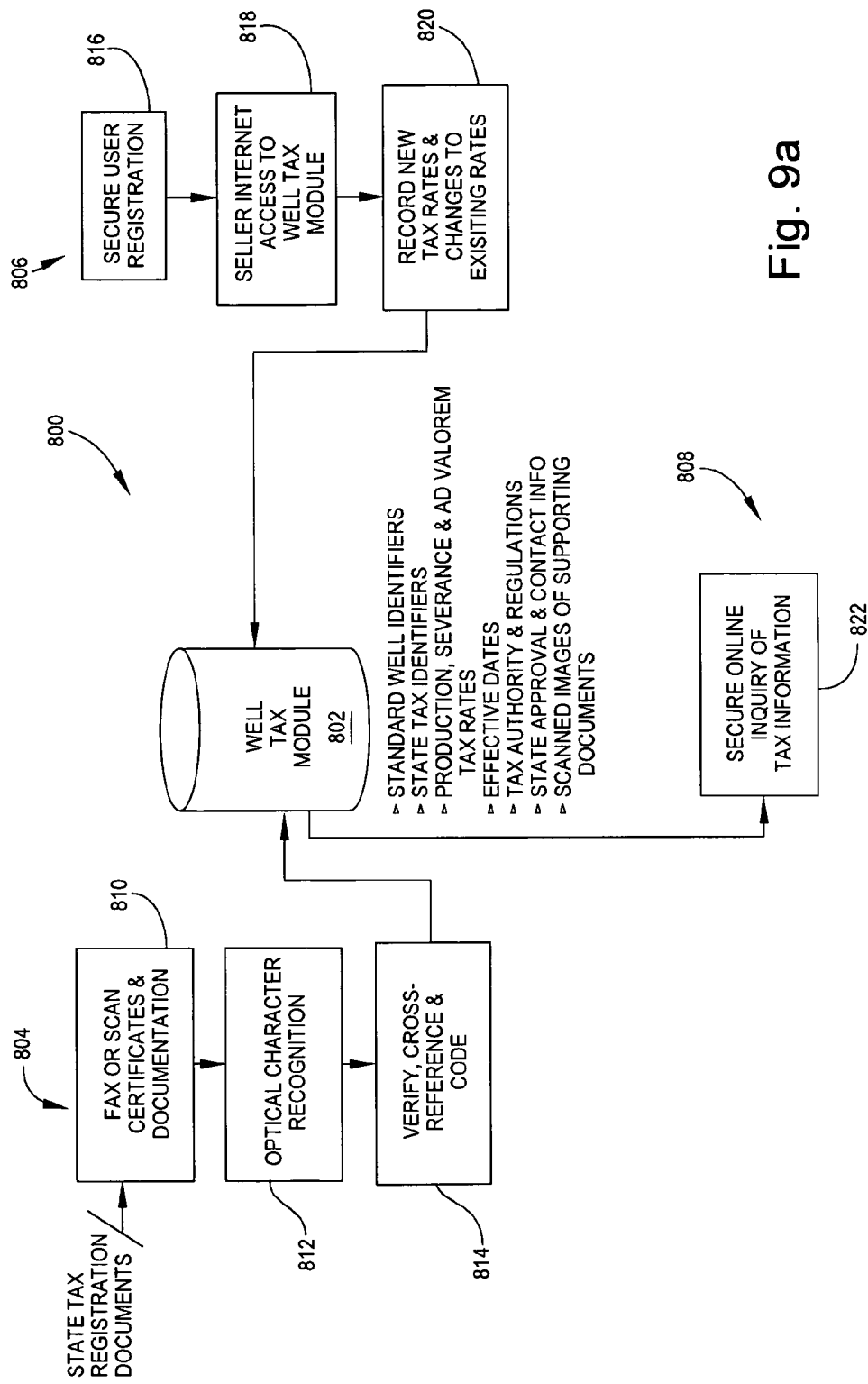
FIGS. 9a and 9b are schematic illustrations of a well tax module.
Figure 9B:
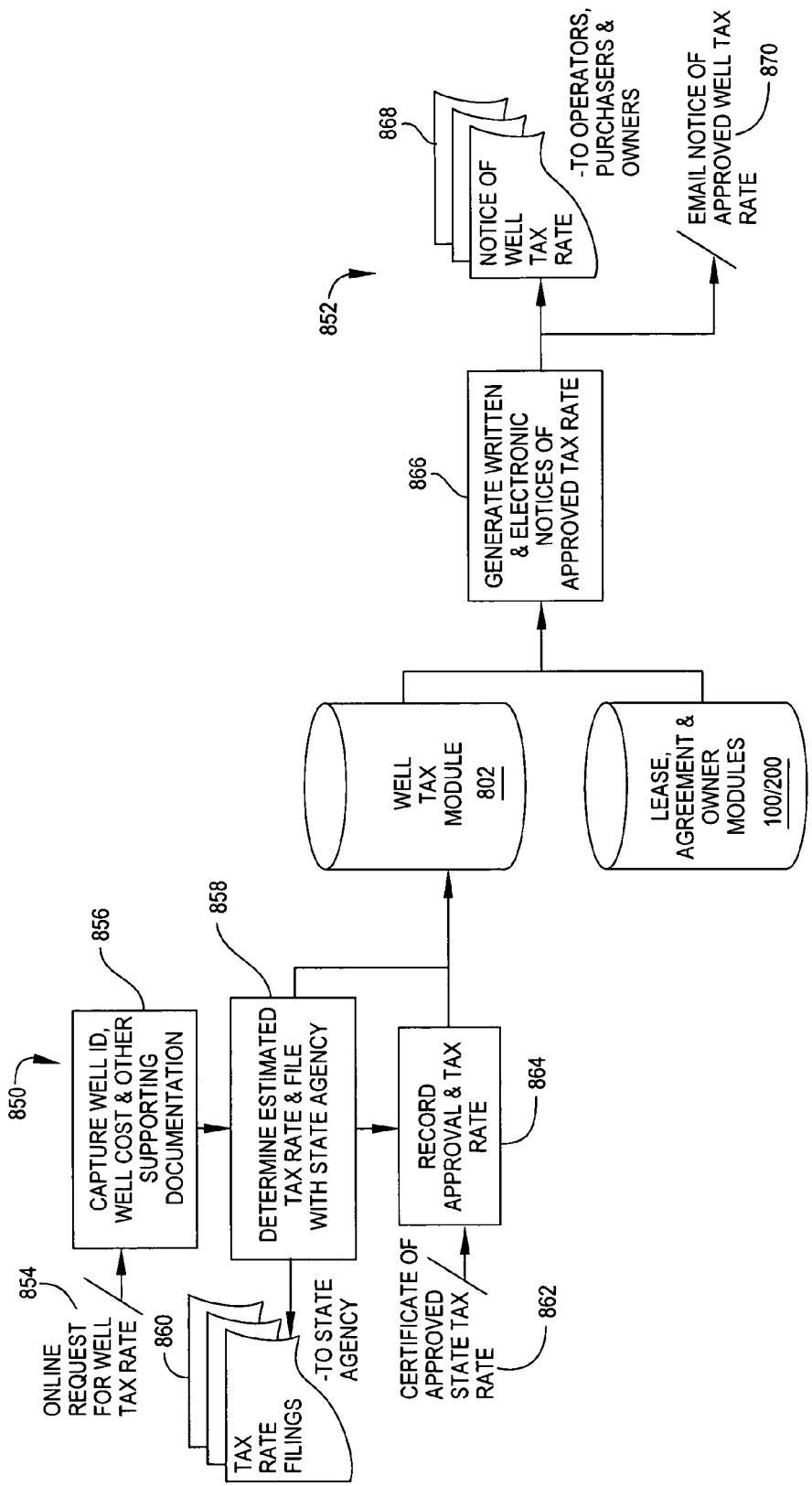

One embodiment of well tax module 800 is illustrated in FIGS. 9a and 9b.

Well tax module 800 may record and maintain well tax information, see FIG. 9a. Well tax module 800 may also create tax filings, see FIG. 9b.

A central feature of module 800 is database is 802. Database 802 comprises records about tax information related to the sale of minerals within system 10. A record in database 802 may comprise one or more of the following fields: standard well identifiers; state tax identifiers; production, severance, and ad valorem tax rates; effective dates; tax authorities and regulations; state approval and contact information; and scanned images of supporting documents. Other fields may be added hereto as deemed appropriate.

In the embodiment illustrated in FIG. 9a, module 800 includes, in addition to database 802, an application 804 for capturing tax filing information, an application 806 for the maintenance of well tax information, and an application 808 for accessing well tax information. The module may include additional or other applications as deemed appropriate.

Application 804 for capturing tax filing information may include: a procedure 810 for electronically capturing tax registration documents, for example, by fax or scanning; a procedure 812 for converting electronically captured in documents into an electronic form, for example, by optical character recognition; and a procedure 814 for verifying in cross-referencing the information obtained from the tax registration documents.

Application 806 for the maintenance of tax information may include: a procedure 816 for providing secure access to records contained in the database 802; a procedure 818 for secure communication; and a procedure 820 for making changes to records contained in database 802.

Application 808 for access to the tax information may include a secure means for accessing such information, for example, over a secure Internet access means 822.

In any embodiment illustrated in FIG. 9b, module 800 may include, in addition to database 802, an application 850 for generating tax filings, and an application 852 for notifying owners, operators and purchasers of tax rates. The module may include additional or other applications as deemed appropriate.

Application 850 may operate as follows: a request 854 is made for a tax filing for a particular entity, the relevant information for preparing the tax filing is gathered 856 from various databases within system 10, an estimated tax filing is prepared 858, a hard copy of the estimated tax filing may be submitted to the tax authority 860, a tax certificate of approval 862 may be generated by the tax authority, and that tax certificate is recorded 864 within the database 802.

Application 852 provides a means 866 for generating written 868 and electronic 870 notices of approved tax rates to owners, operators, and purchasers.

Mineral Ownership Book Entry and Netting Module 900

Figure 10A:
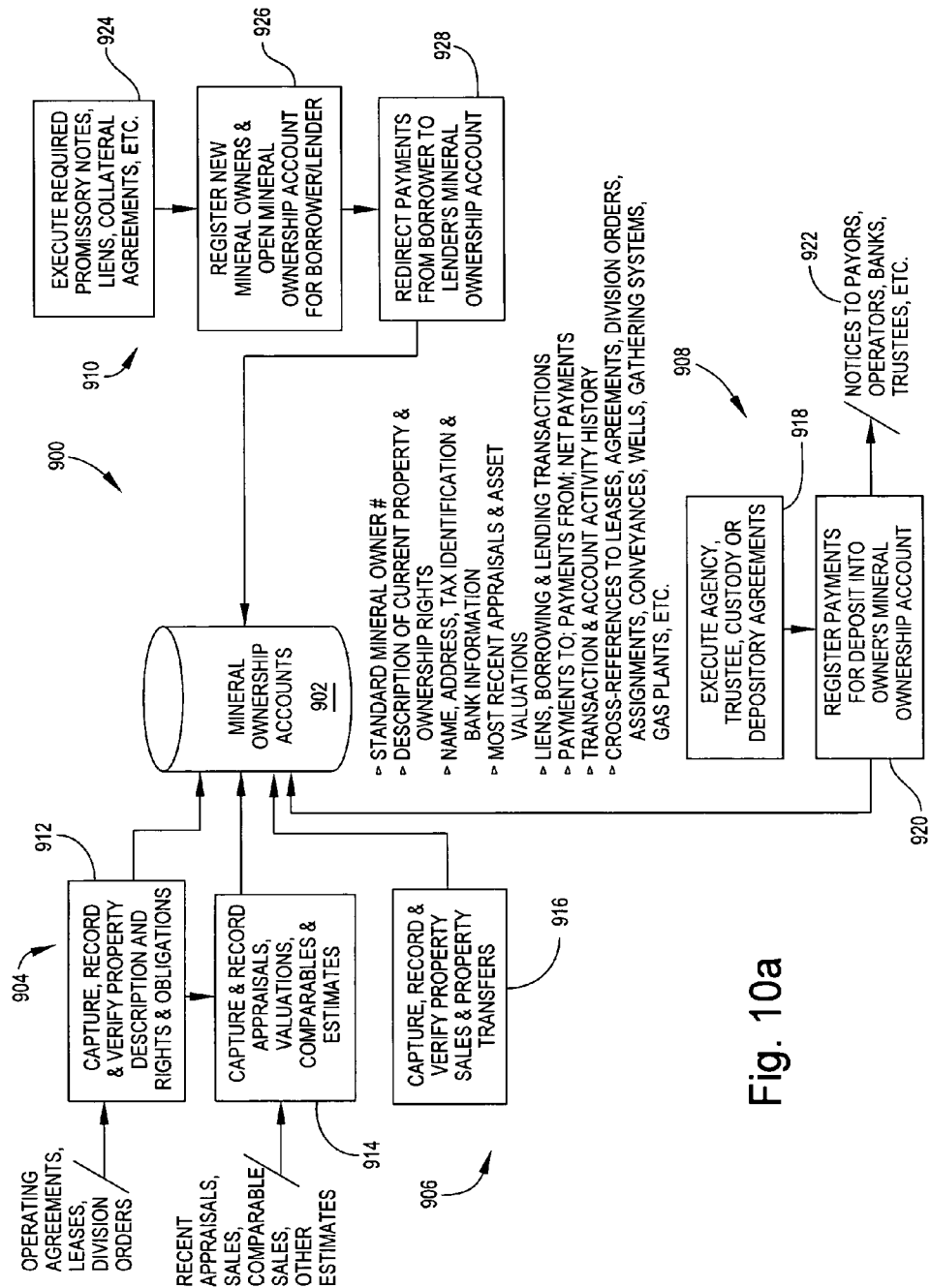
FIGS. 10a and 10b are schematic illustrations of a mineral ownership and book entry and netting module.
Figure 10B:
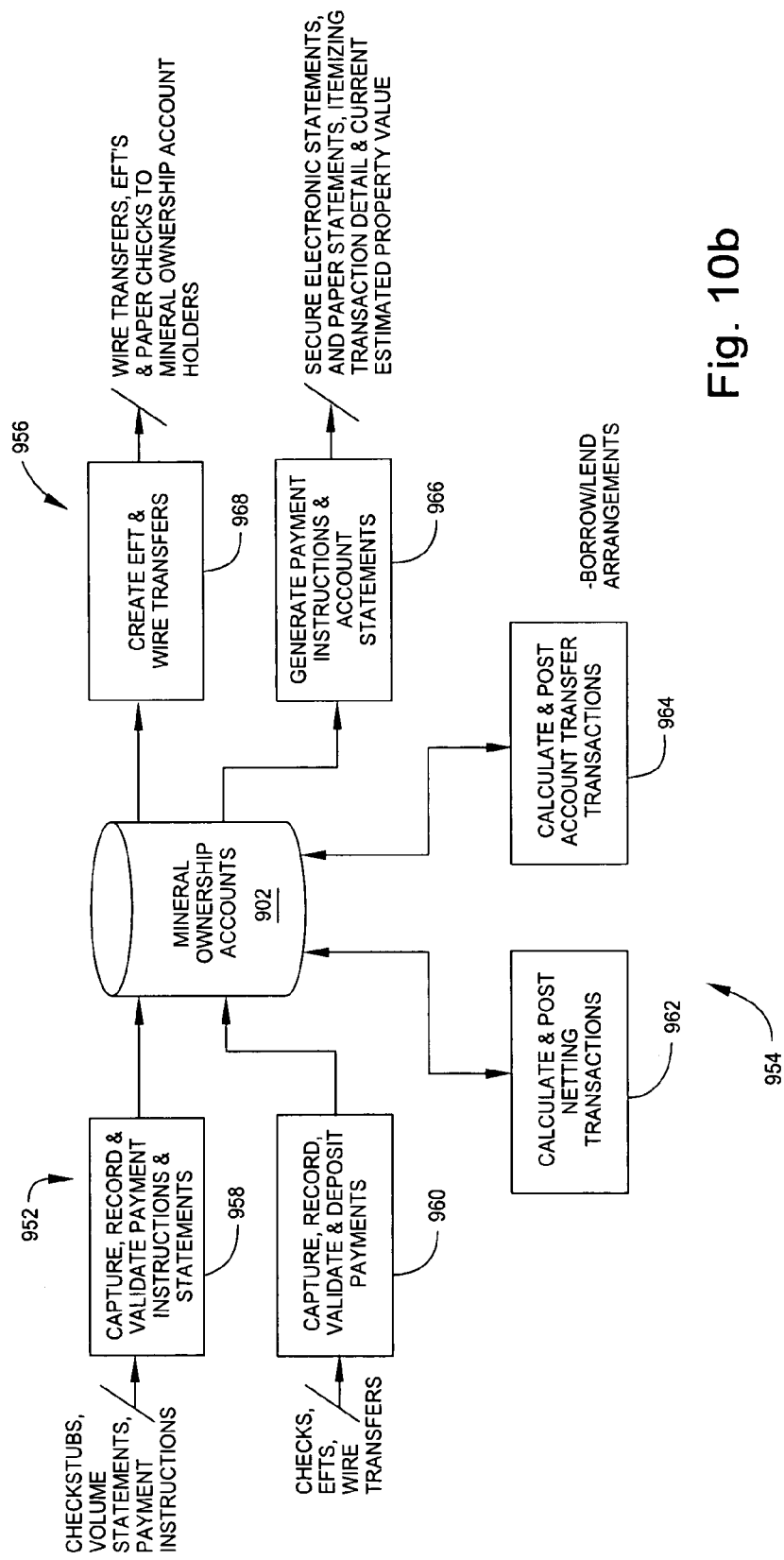

One embodiment of mineral ownership book entry and netting module 900 is illustrated in FIGS. 10a and 10b.

Mineral ownership book entry and netting module 900 records and maintains ownership in the book entry form, see FIG. 10a. Mineral ownership book entry and netting module 900 also records and maintains net-out and transfer payments, see FIG. 10b.

A central feature of module 900 is database 902. Database 902 comprises records for each owner in system 10 a record in database 902 may comprise one or more of the following fields: a standard mineral owner number; a description of current property and ownership rights; name, address, tax identification and bank information; most recent appraisals and asset valuations; liens, borrowing, and lending transactions; payments to, payments from, net payments; transaction and account activity history; and cross-references to leases, agreements, division orders, assignments, conveyances, wells, gathering systems, and gas plants. Other fields may be added hereto as deemed appropriate.

In the embodiment illustrated in FIG. 10a, module 900 includes, in addition to database 902, an application 904 to capture, record and verify mineral rights and appraisals, an application 906 for the capture of property sales and transfers; and application 908 for directing all payments to a mineral ownership account; and an application 910 for recording borrowing and lending transactions against a mineral ownership account. The module may include additional or other applications as deemed appropriate.

Application 904 for capturing and recording mineral rights and appraisal information may operate as follows: a procedure 912 initially captures, verifies, and records information, such as property descriptions, rights and obligations (this information may be obtained from other modules within system 10 and/or need to be updated to other modules within system 10), and a procedure 914 captures and records appraisals, valuations, comparables and estimates related to the properties.

Application 906 for the capture of property sales and transfer information may include an application 916 for capturing, verifying and recording property sales and property transfer information.

Application 908 for correcting payments to mineral ownership accounts may include: a procedure 918 for executing agency, trustee, custody, or depository agreements; a procedure 920 for registering payments for deposits into owner's mineral ownership accounts; and a procedure 922 for notifying owners when such payments are made.

Application 910 for recording borrowing and lending transactions against ownership accounts may include: a procedure 924 for executing the required documentation, such as promissory notes, liens, collateral agreements, and the like; a procedure 926 for registering new mineral owner accounts and opening mineral owner accounts for borrowing and lending transactions; and a procedure 928 for redirecting payments from a borrower to a lender's mineral ownership account.

In the embodiment illustrated in FIG. 10b, module 900 may include: an application 952 for capturing payment information and payment instructions; an application 954 for calculating post net-outs and fund transfers; and an application 956 for creating net payments and account statements. The module may include additional or other applications as deemed appropriate.

Application 952 for capturing payment information and payment instructions may include a procedure 958 for capturing, recording, and validating payment instructions and statements, and a procedure 960 for capturing, recording, validating, and depositing payments.

Application 954 for calculating and posting net-outs and fund transfers may include a procedure 962 for calculating and posting netting transactions and a procedure 964 for calculating and posting account transfer transactions based upon the lend/borrow arrangements.

Application 956 for creating net payments and account statements may include a procedure 966 for generating payment instructions and account statements, and a procedure 968 for creating electronic fund transfers and wire transfers.

EXEMPLARY EMBODIMENTS OF THE INVENTION

The following are exemplary embodiments of the present invention. These embodiments are not limiting, but are merely another expression of the invention disclosed herein.

A. An electronic settlement system for mineral production, distribution, and sales comprising:

a plurality of modules, said modules comprising, at least two of the following: payor module, well tax module, mineral owner module, division order module, gathering system and gas plant module, wellhead price module, mineral lease and agreement module, product movement and balancing module, mineral ownership and book entry and netting module, and a processor for using information from said plurality of modules.

B. The electronic settlement system of claim A wherein said processor further comprising a processor for calculating payments for minerals sold.

C. The electronic settlement system of claim A wherein said processor further comprising a processor for reporting payments for minerals sold.

D. The electronic settlement system of claim A wherein said processor further comprising a processor for creating payment instructions and/or making payments for minerals sold and collections for minerals sold.

E. The electronic settlement system of claim A wherein said processor further comprising a processor for netting offsetting payments between payors and/or mineral owners.

F. The electronic settlement system of claim A wherein said processor further comprising a processor for performing banking functions.

G. The electronic settlement system of claim A wherein said processor further comprising a processor for loan management of borrowing and/or lending activity based upon mineral rights.

H. The electronic settlement system of claim A wherein said processor being an electronic processor.

I. The electronic settlement system of claim A wherein said mineral owner module comprising:

a database comprising mineral owner information, an inputting processor for adding said mineral owner information into said database, an accessing processor for reviewing said mineral owner information in said database, and an updating and/or maintaining processor for maintaining said mineral owner information in said database.

J. The electronic settlement system of claim I wherein said mineral owner information comprising, alone or in combination, the following: mineral owner identifier; mineral owner contact information; information about mineral owner's agents, trustees, designees, administrators, and/or executors; mineral owner tax identifiers; estate probate information; escheat history.

K. The electronic settlement system of claim I further comprising a notification processor for notifying owner's of changes to mineral owner information in said database.

L. The electronic settlement system of claim I wherein said updating and/or maintaining processor further comprising a processor for allowing secure, self service amendment of mineral owner information.

M. The electronic settlement system of claim A wherein said mineral lease and agreement module comprising:

a database for information about mineral leases and agreements, an inputting processor for inputting information about mineral leases and agreements into the database, an accessing processor for reviewing information about mineral leases and agreements in the database, and an updating and/or maintaining processor for maintaining information about mineral leases and agreements in said database.

N. The electronic settlement system of claim M wherein said information about mineral leases and agreements comprising, alone or in combination, the following: lease/agreement identifiers, stipulations and provisions, rights and obligations, land descriptions and surveys, polygons and geospatial data, assignment and conveyance information, key dates, scanned images and supporting documents, contact information, cross-references to mineral locations, formation, assets, and related information.

O. The electronic settlement system of claim M further comprising a cross-referencing processor for associating information about mineral leases and agreements to itself and other related information.

P. The electronic settlement system of claim M wherein said updating and/or maintaining processor further comprising a processor for allowing secure, self service amendment of mineral lease and agreement information.

Q. The electronic settlement system of claim A wherein said division order module comprising:

a database for division order information, an inputting processor for adding said division order information into said database, an accessing processor for reviewing said division order information in said database, an updating and/or maintaining processor for maintaining said division order information.

R. The electronic settlement system of claim Q wherein said division order information comprising, alone or in combination, the following: division order identifier; owner contact information; ownership information; description of land and mineral rights; description of obligations; ownership history (chain of title); cross-references to lease, assignments, conveyances; key dates; scanned images of key documents; cross-references to location of mineral rights, units, formations.

S. The electronic settlement system of claim Q further comprising a reporting processor for generating reports of division order information.

T. The electronic settlement system of claim Q further comprising a change-to-division order processor for receiving instructions to change division orders, verifying said instructions, changing division order information in said database, and reporting said change-to-division order.

U. The electronic settlement system of claim Q wherein said updating and/or maintaining processor further comprising a processor for allowing secure, self service amendment of division order information.

V. The electronic settlement system of claim U wherein said amendment processor further comprising a processor for reviewing and approving division orders.

W. The electronic settlement system of claim A wherein said wellhead price module comprising:
 a database for wellhead price information,
 a capture processor for gathering wellhead price information,
 an accessing processor for reviewing wellhead price information, and
 an updating and/or maintaining processor for maintaining wellhead price information.

X. The electronic settlement system of claim W wherein said mineral price information comprising, alone or in combination, the following: purchaser information, information about mineral bought/sold, commodity code, effective date, add-ons/deducts, reimbursements, volume basis and pricing units, related indices and prices, cross-references to location of mineral and contracts.

Y. The electronic settlement system of claim W wherein said updating and/or maintaining processor further comprising a processor for allowing secure, self service amendment of mineral price information.

Z. The electronic settlement system of claim A wherein said payor module comprising:
 a database comprising payor information,
 an inputting processor for adding said payor information into said database,
 an accessing processor for reviewing said payor information in said database, and
 an updating and/or maintaining processor for maintaining said payor information in said database.

AA. The electronic settlement system of claim Z wherein said payor information comprising owner codes, bank codes, product codes, property codes, lease codes, division of interest (DOI) codes, transaction description codes, pressure base standards, energy value (e.g., BTU) standards, transaction contract standards, statement timing, contact information, and cross-references to leases, agreements, wells, units, facilities, and control points.

BB. The electronic settlement system of claim Z wherein said inputting processor further comprising:
 means for extracting said payor information from source documents,
 a compiling processor for assembling said payor information extracted from said source documents, and
 a system for organizing said payor information.

CC. The electronic settlement system of claim Z where said input means further comprising:
 an inputting processor for new payor information,
 a comparing processor for comparing new payor information to said payor information in said database, and
 a processor for adding new payor information to said database should new payor information differ from said payor information in said database.

DD. The electronic settlement system of claim Z further comprising a cross-referencing processor for linking payor information to payment instructions.

EE. The electronic settlement system of claim Z wherein said payor information being information related to mineral rights.

FF. The electronic settlement system of claim Z wherein said updating and/or maintaining processor further comprising a processor for allowing secure, self service amendment of payor information.

GG. The electronic settlement system of claim A wherein said product movement and balancing module comprising:
 a database for product movement and balancing information,
 an inputting processor for inputting information about product movement into said database,
 an accessing processor for reviewing information about product movement and balancing in said database,
 a balancing processor for balancing product movement information in said database, and
 an updating and/or maintaining processor for maintaining product movement and balancing information.

HH. The electronic settlement system of claim GG wherein said product movement and balancing information comprising, alone or in combination, the following: volume control points, actual production volumes, links to producing mineral locations, operator and producer information, gross working interests, monthly available volumes, production downtime, elections to transport, sell, invoke make-up by producers, nominated volumes, volume imbalances by month and cumulative to date, cross-references to mineral locations, division orders, lease, and agreements, gathering systems and gas plants.

II. The electronic settlement system of claim GG further comprising a dissemination processor for generating a report of product movement and balance information from said database.

JJ. The electronic settlement system of claim GG wherein said updating and/or maintaining processor further comprising a processor for allowing secure, self service amendment of product movement and balancing information.

KK. The electronic settlement system of claim A wherein said gathering system and gas plant module comprising:
 a database of information about flow configurations and operating characteristics of oil and gas gathering systems and natural gas processing plants,
 an inputting processor for inputting said information about flow configurations and operating characteristics of oil and gas gathering systems and natural gas processing plants,
 an accessing processor for reviewing information about flow configurations and operating characteristics of oil and gas gathering systems and natural gas processing plants, and
 an updating and/or maintaining processor for maintaining information about flow configurations and operating characteristics of oil and gas gathering systems and natural gas processing plants.

LL. The electronic settlement system of claim KK wherein said information about flow configurations and operating characteristics of oil and gas gathering systems and natural gas processing plants comprising, alone or in combination, the following: production facility identifier, production facility location information, measurement point information, effective dates, production facility efficiencies, lab results of minerals produced, production facility contact information, contract terms and provisions, pipeline connections.

MM. The electronic settlement system of claim KK wherein said updating and/or maintaining processor further comprising a processor for allowing secure, self service amendment of said information about flow configurations and operating characteristics of oil and gas gathering systems and natural gas processing plants.

NN. The electronic settlement system of claim A wherein said tax module comprising:
- a database comprising mineral tax information,
- an inputting processor for adding mineral tax information into said database,
- an accessing processor for reviewing said mineral tax information in said database, and
- an updating and/or maintaining processor for maintaining said mineral tax information.

OO. The electronic settlement system of claim NN wherein said mineral tax information comprising alone or in combination the following mineral location, tax authority identifier for mineral location, production tax rate, severance tax rate, ad valorem tax rate, effective date of tax rate, tax authority information, tax authority regulations, images of supporting documents.

PP. The electronic settlement system of claim NN further comprising a cross-referencing processor for linking a first part of the mineral tax information to a second part of the mineral tax information.

QQ. The electronic settlement system of claim PP wherein said first part being a mineral location and said second part being a tax authority identifier.

RR. The electronic settlement system of claim NN further comprising a tax filing processor for generating tax returns using said mineral tax information.

SS. The electronic settlement system of claim NN wherein said updating and/or maintaining processor further comprising a processor for allowing secure, self service amendment of mineral tax information.

TT. The electronic settlement system of claim A wherein said mineral owner account module comprising:
- a database of mineral ownership account information,
- an inputting processor for inputting mineral ownership account information into said database,
- an accessing processor for reviewing mineral ownership account information in said database, and
- an updating and/or maintaining processor for maintaining mineral ownership account information in said database.

UU. The electronic settlement system of claim TT wherein said mineral ownership account information comprising, alone or in combination, the following: mineral owner identifier, description of mineral location (current property) and ownership interest, mineral owner information, appraisals and asset valuations of mineral, liens, borrowing and lending transactions, payment information; transaction and account activity history; cross-references to lease, agreement, division orders, assignments, conveyances, mineral rights, gathering systems and gas plants.

VV. The electronic settlement system of claim UU further comprising a payment processor for directing payments to ownership accounts.

WW. The electronic settlement system of claim VV wherein said payment processor further comprising a reporting processor for reporting payments made to ownership accounts.

XX. The electronic settlement system of claim TT wherein said updating and/or maintaining processor further comprising a processor for allowing secure, self service amendment of mineral ownership account information.

The present invention may be embodied in other forms without departing from the spirit and the essential attributes thereof, and, accordingly, reference should be made to the appended claims, rather than to the foregoing specification, as indicated the scope of the invention.

We claim:

1. An electronic settlement system for mineral production, distribution, and sales comprising:
   - a plurality of modules, said modules comprising payor module, mineral owner module, gathering system and gas plant module, wellhead price module, mineral lease and agreement module, division order module, product movement and balancing module, mineral ownership and book entry and netting module;
   - said mineral owner module comprising a database comprising mineral owner information, an inputting processor configured to electronically said mineral owner information into said database, an accessing processor configured to electronically review said mineral owner information in said database, and an updating and/or maintaining processor configured to electronically maintain said mineral owner information in said database;
   - said mineral lease and agreement module comprising a database for information about mineral leases and agreements, an inputting processor configured to input information about mineral leases and agreements into the database, an accessing processor configured to review information about mineral leases and agreements in the database, and an updating and/or maintaining processor configured to maintain information about mineral leases and agreements in said database;
   - said division order module comprising a database for division order information, an inputting processor configured to electronically add said division order information into said database, an accessing processor configured to electronically review said division order information in said database, and an updating and/or maintaining processor configured to electronically maintain said division order information;
   - said division order information comprising a standard division order number; owner names, numbers, and addresses; ownership information; description of land, mineral rights and obligations; ownership history, chain of title; grantor's and grantees; cross-references to leases, assignments, and conveyances; key dates; scanned images of supporting documents; cross-references to location on mineral rights, units and formations;
   - said wellhead price module comprising a database for wellhead price information, a capture processor configured to gather wellhead price information, an accessing processor for reviewing wellhead price information, and an updating and maintaining processor configured to update and maintaining wellhead price information, said updating and maintaining processor including a security means for allowing authorized entity access, a secure communication means and a means for making changes to and updating wellhead prices on a variable basis; and
   - the settlement system being comprised of one or more processors which interact with said plurality of modules;
   - the settlement system being adapted to authenticate and reconcile a volume of minerals produced from a wellhead, compute a value for minerals produced from a wellhead, generate a settlement value for minerals produced from a wellhead, compute a payment due to one or more parties and/or intermediate payment between one or more parties.

2. The electronic settlement system of claim 1 wherein said processor further comprising a processor configured to calculate payments for minerals sold.

3. The electronic settlement system of claim 1 wherein said processor further comprising a processor configured to report payments for minerals sold.

4. The electronic settlement system of claim 1 wherein said processor further comprising a processor configured to create payment instructions and/or making payments for minerals sold and collections for minerals sold.

5. The electronic settlement system of claim 1 wherein said processor further comprising a processor for netting offsetting payments between payors and/or mineral owners.

6. The electronic settlement system of claim 1 wherein said processor further comprising a processor configured to perform banking functions.

7. The electronic settlement system of claim 1 wherein said processor further comprising a processor for loan management of borrowing and/or lending activity based upon mineral rights.

8. The electronic settlement system of claim 1 wherein said processor being an electronic processor.

9. The electronic settlement system of claim 1 wherein said mineral owner information comprising, alone or in combination, the following: mineral owner identifier; mineral owner contact information; information about mineral owner's agents, trustees, designees, administrators, and/or executors; mineral owner tax identifiers; estate probate information; escheat history.

10. The electronic settlement system of claim 1 wherein said information about mineral leases and agreements comprising, alone or in combination, the following: lease/agreement identifiers, stipulations and provisions, rights and obligations, land descriptions and surveys, polygons and geo-spatial data, assignment and conveyance information, key dates, scanned images and supporting documents, contact information, cross-references to mineral locations, formation, assets, and related information.

11. The electronic settlement system of claim 1, wherein said division order information comprising, alone or in combination, the following: division order identifier; owner contact information; ownership information; description of land and mineral rights; description of obligations; ownership history (chain of title); cross-references to lease, assignments, conveyances; key dates; scanned images of key documents; cross-references to location of mineral rights, units, formations.

12. The electronic settlement system of claim 1 wherein said wellhead price information comprising, alone or in combination, the following: purchaser information, information about mineral bought/sold, commodity code, effective date, add-ons/deducts, reimbursements, volume basis and pricing units, related indices and prices, cross-references to location of mineral and contracts.

13. The electronic settlement system of claim 1 wherein said payor module comprising: a database comprising payor information, an inputting processor configured to add said payor information into said database, an accessing processor configured to review said payor information in said database, and an updating and/or maintaining processor configured to maintain said payor information in said database.

14. The electronic settlement system of claim 13 wherein said payor information comprising owner codes, bank codes, product codes, property codes, lease codes, division of interest (DOI) codes, transaction description codes, pressure base standards, energy value (e.g., BTU) standards, transaction contract standards, statement timing, contact information, and cross-references to leases, agreements, wells, units, facilities, and control points.

15. The electronic settlement system of claim 1 wherein said product movement and balancing module comprising: a database for product movement and balancing information, an inputting processor configured to input information about product movement into said database, an accessing processor configured to review information about product movement and balancing in said database, a balancing processor for balancing product movement information in said database, and an updating and/or maintaining processor configured to maintain product movement and balancing information.

16. The electronic settlement system of claim 15 wherein said product movement and balancing information comprising, alone or in combination, the following: volume control points, actual production volumes, links to producing mineral locations, operator and producer information, gross working interests, monthly available volumes, production downtime, elections to transport, sell, invoke make-up by producers, nominated volumes, volume imbalances by month and cumulative to date, cross-references to mineral locations, division orders, lease, and agreements, gathering systems and gas plants.

17. The electronic settlement system of claim 1 wherein said gathering system and gas plant module comprising: a database of information about flow configurations and operating characteristics of oil and gas gathering systems and natural gas processing plants, an inputting processor configured to input said information about flow configurations and operating characteristics of oil and gas gathering systems and natural gas processing plants, an accessing processor configured to review information about flow configurations and operating characteristics of oil and gas gathering systems and natural gas processing plants, and an updating and/or maintaining processor configured to maintain information about flow configurations and operating characteristics of oil and gas gathering systems and natural gas processing plants.

18. The electronic settlement system of claim 17 wherein said information about flow configurations and operating characteristics of oil and gas gathering systems and natural gas processing plants comprising, alone or in combination, the following: production facility identifier, production facility location information, measurement point information, effective dates, production facility efficiencies, lab results of minerals produced, production facility contact information, contract terms and provisions, pipeline connections.

19. The electronic settlement system of claim 1 further comprising a well tax module comprising:
   a database comprising mineral tax information,
   an inputting processor for adding mineral tax information into said database,
   an accessing processor for reviewing said mineral tax information in said database, and
   an updating and/or maintaining processor for maintaining said mineral tax information.

20. The electronic settlement system of claim 19 wherein said mineral tax information comprising alone or in combination the following mineral location, tax authority identifier for mineral location, production tax rate, severance tax rate, ad valorem tax rate, effective date of tax rate, tax authority information, tax authority regulations, images of supporting documents.

21. The electronic settlement system of claim 1 wherein said mineral owner account module comprising:
   a database of mineral ownership account information,
   an inputting processor for inputting mineral ownership account information into said database,
   an accessing processor for reviewing mineral ownership account information in said database, and an updating and/or maintaining processor for maintaining mineral ownership account information in said database.

22. The electronic settlement system of claim 21 wherein said mineral ownership account information comprising, alone or in combination, the following: mineral owner identifier, description of mineral location (current property) and ownership interest, mineral owner information, appraisals and asset valuations of mineral, liens, borrowing and lending transactions, payment information; transaction and account activity history; cross-references to lease, agreement, division orders, assignments, conveyances, mineral rights, gathering systems and gas plants.

\* \* \* \* \*